(12) United States Patent
Robinson

(10) Patent No.: US 10,871,265 B2
(45) Date of Patent: *Dec. 22, 2020

(54) VEHICULAR HEADLAMP SYSTEM WITH A PHOTOCHROMIC LENS

(71) Applicant: Ford Global Technologies, LLC, Dearborn, MI (US)

(72) Inventor: Connor I. Robinson, Austin, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,750

(22) Filed: Dec. 4, 2019

(65) Prior Publication Data

US 2020/0109832 A1 Apr. 9, 2020

Related U.S. Application Data

(63) Continuation of application No. 15/493,955, filed on Apr. 21, 2017, now Pat. No. 10,544,916.

(51) Int. Cl.

| | |
|---|---|
| *F21S 41/64* | (2018.01) |
| *F21S 41/43* | (2018.01) |
| *F21S 41/657* | (2018.01) |
| *F21S 41/20* | (2018.01) |
| *B60Q 1/00* | (2006.01) |
| *B60Q 1/08* | (2006.01) |
| *B60Q 1/14* | (2006.01) |

(52) U.S. Cl.
CPC ............ *F21S 41/64* (2018.01); *B60Q 1/0023* (2013.01); *B60Q 1/085* (2013.01); *B60Q 1/143* (2013.01); *F21S 41/285* (2018.01); *F21S 41/43* (2018.01); *F21S 41/657* (2018.01); *B60Q 2300/42* (2013.01); *B60Q 2300/45* (2013.01)

(58) Field of Classification Search
CPC ...................................................... G02C 7/102
See application file for complete search history.

(56) References Cited

U.S. PATENT DOCUMENTS

| | | | |
|---|---|---|---|
| 5,517,389 | A | 5/1996 | Myers |
| 5,604,626 | A | 2/1997 | Teowee |
| 6,281,806 | B1 | 8/2001 | Smith |
| 6,831,261 | B2 | 12/2004 | Schofield |
| 7,630,803 | B2 | 12/2009 | Stam |
| 7,782,184 | B2 | 8/2010 | Wittorf |
| 7,791,458 | B2 | 9/2010 | Shimaoka |
| 8,367,211 | B2 | 2/2013 | Qin |
| 8,425,092 | B2 | 4/2013 | Kobayashi |
| 8,610,992 | B2 | 12/2013 | Varaprasad |
| 9,283,903 | B2 | 3/2016 | Abou |

(Continued)

FOREIGN PATENT DOCUMENTS

GB 250559 2/1927

*Primary Examiner* — Diane I Lee
*Assistant Examiner* — Zachary J Snyder
(74) *Attorney, Agent, or Firm* — David Coppiellie; Price Heneveld LLP

(57) ABSTRACT

A headlamp system for a vehicle is provided that includes: a headlamp comprising a photochromic lens, a primary light source for transmitting a headlamp pattern through the lens and a secondary light source; an imaging sensor; and a controller that directs the secondary light source to darken a portion of the lens in response to an object exterior to the vehicle sensed by the sensor.

20 Claims, 5 Drawing Sheets

(56) References Cited

U.S. PATENT DOCUMENTS

| | | | |
|---|---|---|---|
| 9,789,808 B1 | 10/2017 | Hong | |
| 2006/0250809 A1 | 11/2006 | Strazzanti | |
| 2011/0133672 A1* | 6/2011 | Tsang | F21S 10/02 |
| | | | 315/294 |
| 2013/0201708 A1 | 8/2013 | Takahashi | |
| 2014/0328078 A1 | 11/2014 | Williams | |
| 2014/0376076 A1 | 12/2014 | Chen | |
| 2015/0231639 A1 | 8/2015 | Su | |
| 2016/0114720 A1 | 4/2016 | Schlaug | |
| 2017/0363787 A1 | 12/2017 | Acheff | |

* cited by examiner

VEHICULAR HEADLAMP SYSTEM WITH A PHOTOCHROMIC LENS

CROSS-REFERENCE TO RELATED APPLICATION

This application is a continuation application that claims the benefit of priority under 35 U.S.C. § 120 of U.S. patent application Ser. No. 15/493,955, filed Apr. 21, 2017 and entitled "Vehicular Headlamp System with a Photochromic Lens", the content of which is relied upon and incorporated herein by reference in its entirety.

FIELD OF THE INVENTION

The present disclosure generally relates vehicular lighting systems with photochromic lenses, particularly vehicular headlamp systems with photochromic lenses having portions, for example, that can be darkened in response to objects exterior to the vehicle.

BACKGROUND OF THE INVENTION

A recent trend in the automotive industry includes efforts to develop schemes and systems that can facilitate the use of high beam headlamps in the presence of oncoming vehicles, pedestrians and other traffic. Many auto makers have attempted to develop such capabilities, including systems that can move or otherwise orient headlamps away from oncoming vehicles and pedestrians. Other efforts include control systems that can deactivate a left- or right-hand set of high beam elements in response to oncoming vehicles and pedestrians.

Some of these configurations and approaches have been employed to block or obscure light from the headlamps of a vehicle from striking oncoming vehicles, pedestrians and other traffic. Nevertheless, these conventional configurations and approaches have come at the expense of providing sufficient light to illuminate the areas and regions surrounding the oncoming vehicles, pedestrians and other traffic. That is, these conventional adaptive headlamp systems provide a benefit to oncoming vehicles, pedestrians and other traffic that generally comes at the expense of the effectiveness of the headlamp system in illuminating regions in front of the vehicle for the benefit of the driver and passengers of the vehicle.

Accordingly, there is a need to develop adaptive vehicular lighting systems that generate headlamp patterns which can illuminate all regions ahead of the vehicle that are desired to be illuminated (e.g., as required based on federal regulations), while shading, blocking or otherwise obscuring oncoming vehicles, pedestrians and other traffic from these headlamp patterns.

SUMMARY OF THE INVENTION

According to one aspect of the present disclosure, a headlamp system for a vehicle is provided that includes: a headlamp comprising a photochromic lens, a primary light source for transmitting a headlamp pattern through the lens and a secondary light source; an imaging sensor; and a controller that directs the secondary light source to darken a portion of the lens in response to an object exterior to the vehicle sensed by the sensor.

According to another aspect of the present disclosure, a headlamp system for a vehicle is provided that includes: a headlamp comprising a photochromic lens, a primary light source for transmitting a headlamp pattern through the lens and a plurality of secondary light sources; an imaging sensor; and a controller that directs the secondary light sources to darken a portion of the lens in response to an object exterior to the vehicle sensed by the sensor.

According to yet another aspect of the present disclosure, a headlamp system for a vehicle is provided that includes: a headlamp comprising a photochromic lens, a primary light source for transmitting a headlamp pattern through the lens and a movable secondary light source; an imaging sensor; and a controller that directs the secondary light source to darken a portion of the lens in response to an object exterior to the vehicle sensed by the sensor.

Embodiments of the foregoing aspects of the headlamp system for a vehicle can include any one or a combination of the following features:

the photochromic lens comprises an inner lens, the inner lens comprising a photochromic element;

the photochromic lens comprises an outer lens, the outer lens comprising an ultraviolet light shielding element;

the photochromic lens is configured to darken upon exposure to ultraviolet radiation and the secondary light source is configured to transmit ultraviolet light;

the headlamp pattern is a high beam headlamp pattern;

the object sensed by the sensor is a pedestrian, an oncoming vehicle, other traffic or an animal located within the headlamp pattern; and the controller is further configured to aim the secondary light source to darken a portion of the lens in response to an object sensed by the sensor that is exterior to the vehicle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
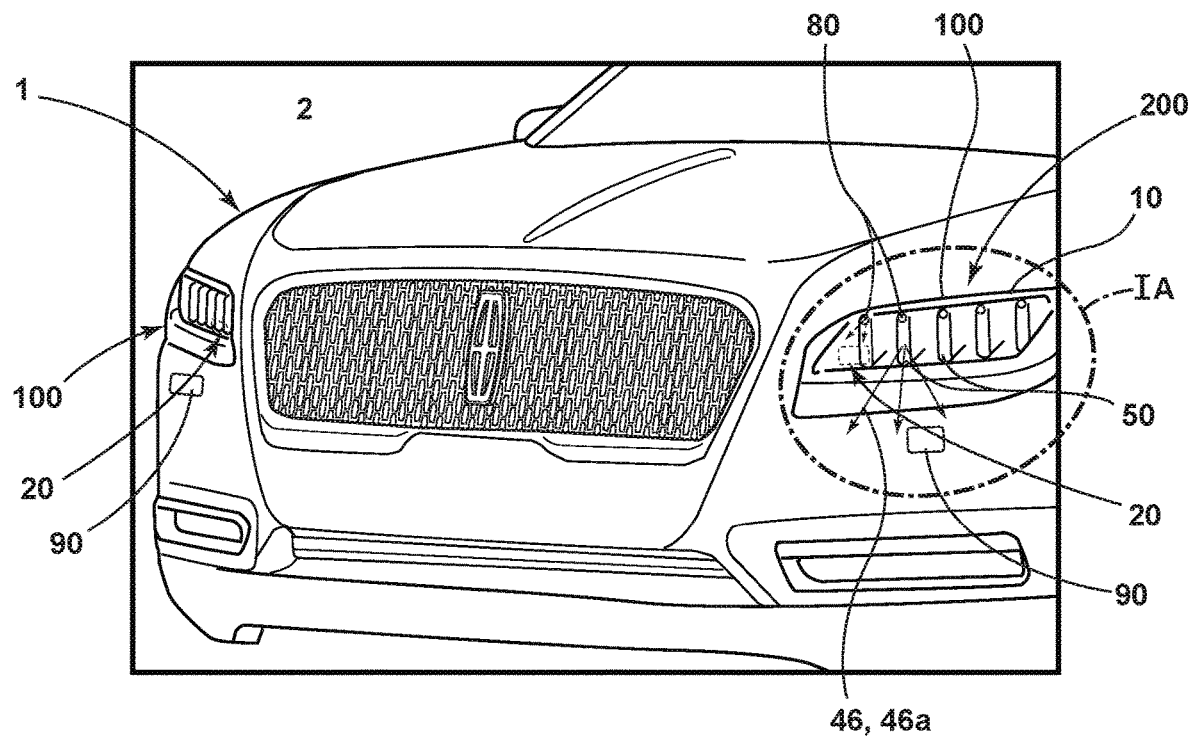
FIG. 1 is a front, perspective view of a headlamp system for a vehicle, according to an aspect of the disclosure.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Further, in this document, relational terms, such as first and second, top and bottom, and the like, are used solely to distinguish one entity or action from another entity or action, without necessarily requiring or implying any actual such relationship or order between such entities or actions.

Aspects of the disclosure generally relate to adaptive vehicular lighting systems that can generate headlamp patterns (e.g., low beam, high beam, etc.) while shading, blocking or otherwise obscuring oncoming vehicles, pedestrians, other traffic and animals from these headlamp patterns. Under normal operation conditions, for example, these systems can generate headlamp patterns forward of the vehicle to assist the driver with operation of the vehicle. As oncoming vehicles, pedestrians and/or other traffic intersect with these headlamp patterns, these systems can shade, block or otherwise obscure portions of the headlamp patterns from blinding and interfering with these vehicles, pedestrians and traffic. Further, these systems can adjust their headlamp patterns in real-time as these oncoming vehicles, pedestrians and/or traffic move relative to the vehicle containing the system.

Advantages of the adaptive vehicular lighting systems of the disclosure include an ability to optimize the amount of light transmitted by the system for its primary functional purpose (e.g., as a high beam headlamp pattern). Further, the lighting system can minimize the amount of transmitted light that impinges on pedestrians, oncoming vehicles, other traffic and animals in the path of the light pattern produced by the system. Further, adaptive vehicular lighting systems of the disclosure can selectively and quickly block limited portions of the transmitted light patterns in response to these objects; and change the blocked portions as the objects move relative to the vehicle or other structure housing the lighting system.

Figure 1A:
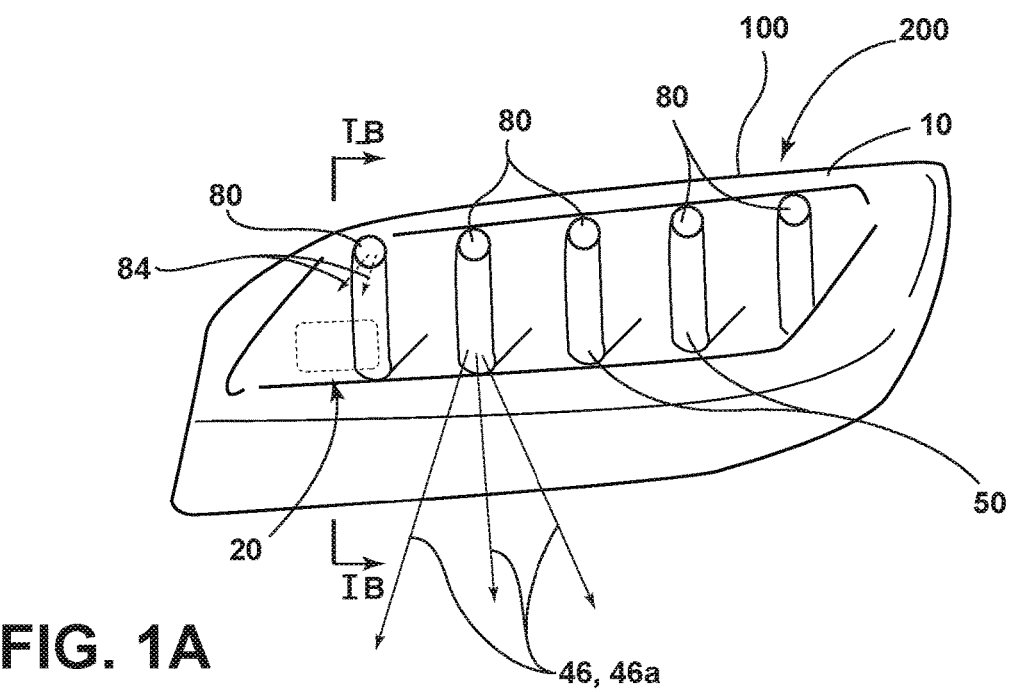
FIG. 1A is an enlarged portion of a headlamp of the headlamp system depicted in FIG. 1, according to an aspect of the disclosure.

Referring now to FIGS. 1, 1A, a headlamp system 200 for a vehicle 1 is depicted that includes a headlamp 100. The headlamp 100 includes a photochromic lens 10, one or more primary light sources 50 for transmitting a headlamp pattern 46 through the lens 10, and one or more secondary sources 80. The system 200 also includes an imaging sensor 90 and a controller 150 (see FIGS. 2, 2A) that directs the secondary light source 80 (or multiple sources 80) to darken a portion 20 of the lens 10 in response to an object 300 (see FIG. 2A) sensed by the sensor 90 exterior to the vehicle 1 (i.e., at a location 2 exterior to the vehicle 1). As the portion 20 of the lens 10 is darkened by the secondary light source 80, the headlamp pattern 46 is converted to an adjusted headlamp pattern 46a. Essentially, the adjusted headlamp pattern 46a is the headlamp pattern 46, as somewhat reduced in extent from the presence of the darkened portion 20 within the lens 10. Further, as used herein, the terms "darken," "darkened" and other terms with like meanings employed in the disclosure refer to a reversible change in the photochromic material employed in the lens 10 (e.g., as within a portion 20 of the lens 10) from a transparent state to an opaque, or darkened, state (i.e., an optical transmissivity of less than 50% in the visible spectrum). This darkening occurs when the photochromic material is locally stimulated by a secondary light source(s) 80 that transmits ultraviolet light that strikes the photochromic material. The exposure of the photochromic material to this light source causes the crystal structure of the material to change, which results in a darkening effect.

In embodiments of the headlamp system 200 depicted in FIGS. 1, 1A, the headlamp 100 is configured to produce a headlamp pattern 46, 46a that is suitable for a low beam, high beam, turn signal, daytime running light and/or fog light pattern. In some embodiments, the headlamp pattern 46, 46a is a high beam, a low beam or a combination of high beam and low beam headlamp pattern. In a preferred embodiment, the headlamp pattern 46, 46a is a high beam headlamp pattern, e.g., as consistent with Federal Motor Vehicle Safety Standard No. 108 ("FMVSS 108").

Embodiments of the headlamp system 200 include a headlamp 100 with one or more primary light sources 50. The light sources 50 can be a single source, a bank of sources or an array of sources that include halogen, light emitting diode (LED), and/or incandescent light sources. Other light sources can also be employed for the light sources 50 within the headlamp 100 that are suitable for producing a headlamp pattern 46, as understood by those with ordinary skill in the field of the disclosure.

According to some embodiments of the headlamp system 200, as depicted in exemplary form in FIGS. 1, 1A, the system includes one or more imaging sensors 90. Each of the sensors 90 is configured to sense objects 300 (see FIG. 2A) in the exterior 2 of the vehicle 1, including but not limited to pedestrians, oncoming vehicles, other traffic and/or animals (e.g., a deer) within or in proximity to the headlamp patterns 46 produced by the system 200. Further, these sensors 90 can be any of various conventional sensors suitable for sensing such objects 300, as understood by those with ordinary skill in the field of the disclosure. In some embodiments of the headlamp system 200, the system can include one or more imaging sensors 90 that can be coupled or are otherwise associated with each headlamp 100. As shown in FIG. 1, an imaging sensor 90 is located in proximity to each headlamp 100. In other embodiments, one or more imaging sensors 90 are associated with each headlamp 100 and placed at other locations of the vehicle 1, e.g., on the front grille, hood, bumper, etc.

Figure 1B:
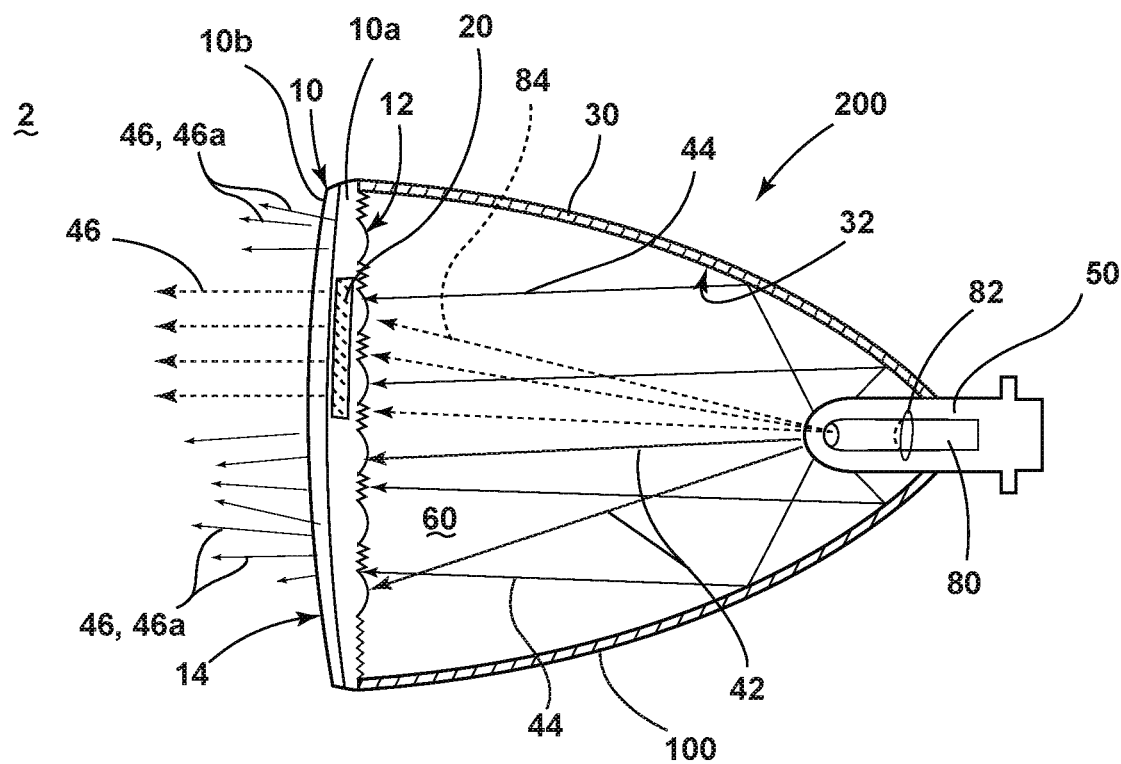
FIG. 1B is a cross-sectional view of the headlamp depicted in FIG. 1A, according to an aspect of the disclosure.

Referring now to FIG. 1B, a headlamp 100 employed in the headlamp system 200 is depicted in a cross-sectional view, as including a primary light source 50 and a secondary light source 80. In particular, the headlamp 100 includes a photochromic lens 10 with an interior primary surface 12 and an exterior primary surface 14. Further, the photochromic lens 10 can darken in response to incident light 84 from the secondary light source 80, and then lighten or otherwise become transparent upon removal of the incident light 84. According to some embodiments, the secondary light source 80, or sources 80, comprises an ultraviolet light source. In a preferred embodiment, the one or more secondary sources 80 employed by the headlamp 100 in the headlamp system 200 is an ultraviolet laser light source, as available and understood by those with ordinary skill in the art. Further, as used herein, the terms "lighten," "lightened," "non-darkened" and other terms with like meanings employed in the disclosure refer to a change in the photochromic material employed in the lens 10 from the "darkened" state to a lightened state. The change in the photochromic material to a lightened state results from the removal of the ultraviolet light being transmitted by the secondary light source(s) 80 against the photochromic material (e.g., within a portion 20 of the lens 10), ensuring that the photochromic material returns to a transparent state. More particularly, the crystal structure of the photochromic material changes again as the ultraviolet light is removed, returning to its transparent, equilibrium state.

According to an embodiment, the photochromic lens 10 includes one or more photochromic materials that can darken in response to incident light 84 in the form of ultraviolet light transmitted from the secondary light source 80, and then lighten or otherwise become transparent upon removal of the incident light 84. In embodiments, the photochromic lens 10 includes one or more photochromic materials that are comparable in structure and composition as those typically employed in eye glasses and sun glasses that shade or darken in response to sun light, as would be readily understood by those with ordinary skill in the field of the disclosure. In embodiments, the photochromic lens 10 comprises one or more photochromic materials that darken through one or more reversible chemical reactions upon exposure to ultraviolet light, e.g., from a secondary light source 80.

Referring again to FIG. 1B, an embodiment of the headlamp 100 employed in the headlamp system 200 includes a primary source 50 configured within a housing 30 and behind a lens 10. In certain aspects, an inner surface 32 of the housing 30 comprises a reflector or reflective-material (e.g., a film or layer having a mirror-like, reflective coating that comprises one or more metals) and spans the portion of the housing between the primary source 50 and the lens 10. As also shown in FIG. 1B, the primary source 50 can produce incident light 42 within the headlamp interior 60 of the headlamp 100. The incident light 42 includes rays that reflect off of the inner surface 32 as reflected light 44 and other rays that travel toward the interior primary surface 12 of the lens 10 without being reflected. The combination of reflected light 44 and incident light 42 from the primary source 50 that exits the lens 10 (i.e., through the interior and exterior primary surfaces 12, 14) can form the headlamp pattern 46 (see also FIGS. 1, 1A).

As also depicted in FIG. 1B and noted earlier, the headlamp 100 employed in the headlamp system 200 includes a photochromic lens 10 that can darken in response to incident light 84 from the secondary light source 80, and then lighten or otherwise become transparent upon removal of the incident light 84. More particularly, the incident light 84 from the secondary light source 80 can travel through the headlamp interior 60, toward the interior primary surface 12, and then darken a portion 20 of the lens 10. Once the portion 20 of the lens 10 has been darkened by exposure to incident light 84 from the secondary source 80, incident light 42 and reflected light 44 from the primary source 50 is partially blocked within the headlamp interior 60 by the portion 20. As a result, the incident light 42 and reflected light 44 that exits the lens 10 (i.e., through the interior and exterior primary surfaces 12, 14) forms an adjusted headlamp pattern 46a. Further, the adjusted headlamp pattern 46a is essentially a subset of the 'full' headlamp pattern 46, as the headlamp pattern 46a includes a darkened region associated with the darkened portion 20. That is, the darkened region within the headlamp pattern 46a is the direct result of a portion 20 of the lens 10 being darkened by exposure to incident light 84 from the secondary source 80.

Referring again to FIG. 1B, the lens 10 of the headlamp 100 employed in the headlamp system 200 can include an inner lens 10a. The inner lens 10a can be configured to be integral within the lens 10 in some aspects. In other embodiments, the inner lens 10a is formed as a film, layer or other similar structure on the innermost surface of the lens 10. In embodiments, the inner lens 10a comprises a transparent or substantially transparent material, such as a glass or polymeric material. According to some embodiments, the inner lens 10a further includes a photochromic element comprising one or more photochromic materials as outlined earlier in the disclosure.

Again referring to FIG. 1B, the lens 10 of the headlamp 100 employed in the headlamp system 200 can also include an outer lens 10b. The outer lens 10b can be configured to be integral with the lens 10 in certain aspects. In other embodiments, the outer lens 10b can be formed as a film, layer or other similar structure on the outermost surface of the lens 10. The outer lens 10b can comprise a transparent or substantially transparent material, such as a glass or polymeric material. According to some embodiments, the outer lens 10b includes an ultraviolet light shielding element. The ultraviolet shielding element can include one or more materials that completely or substantially block ultraviolet light (e.g., ultraviolet light components from sun light) in the exterior 2 of the vehicle 1 (see FIGS. 1, 1A) from passing through the lens 10 and/or reaching any of the photochromic material or materials within the lens 10. As such, an outer lens 10*b* that includes an ultraviolet light shielding element can prevent sun light and other ambient ultraviolet light sources outside of the vehicle containing the headlamp 100 from interfering with the function and performance of the headlamp system 200. In particular, the presence of the ultraviolet light shielding element within the outer lens 10*b* ensures that one or more portions 20 of the lens 10 are not inadvertently darkened by ultraviolet light from outside of the headlamp 100. Still further, the inclusion of an outer lens 10*b* with an ultraviolet shielding element in the headlamp 100 ensures that incident light 84 (e.g., in the form of ultraviolet light from the secondary source 80) does not reach the exterior 2 of the vehicle, thus providing a safety benefit to pedestrians, animals and other living beings in proximity to the headlamp system 200 and headlamp 100.

Referring again to FIG. 1B, the headlamp system 200 can include a secondary source 80 that is movable relative to the headlamp 100. In some embodiments, a controller 150 (see FIGS. 2, 2A) that is coupled to the secondary source 80 can direct, move or otherwise adjust the direction of the incident light 84 transmitted from the secondary source 80. For example, the controller 150, also coupled to the imaging sensor 90 (see FIGS. 2, 2A), can move the secondary light source 80 to darken a particular portion 20 of the lens 10 in response to an object 300 (see FIGS. 2, 2A) sensed by the sensor 90 that is in the exterior 2 of the vehicle 1 housing the headlamp system 200. As the object 300 moves relative to the headlamp 100, the controller can then move the secondary light source 80 and the transmitted incident light 84 to adjust the location of the darkened portion 20 in response to the new location of the object 300. According to some embodiments, the secondary source 80 can be adjusted, moved or otherwise aimed by a positioning system 82. The positioning system 82 can be any of a variety of systems, fixtures and the like suitable for moving the secondary light source 82 in response to an electrical signal, e.g., from the controller 150 (see FIGS. 2, 2A), as would be readily understood by those with ordinary skill in the art.

Figure 2:
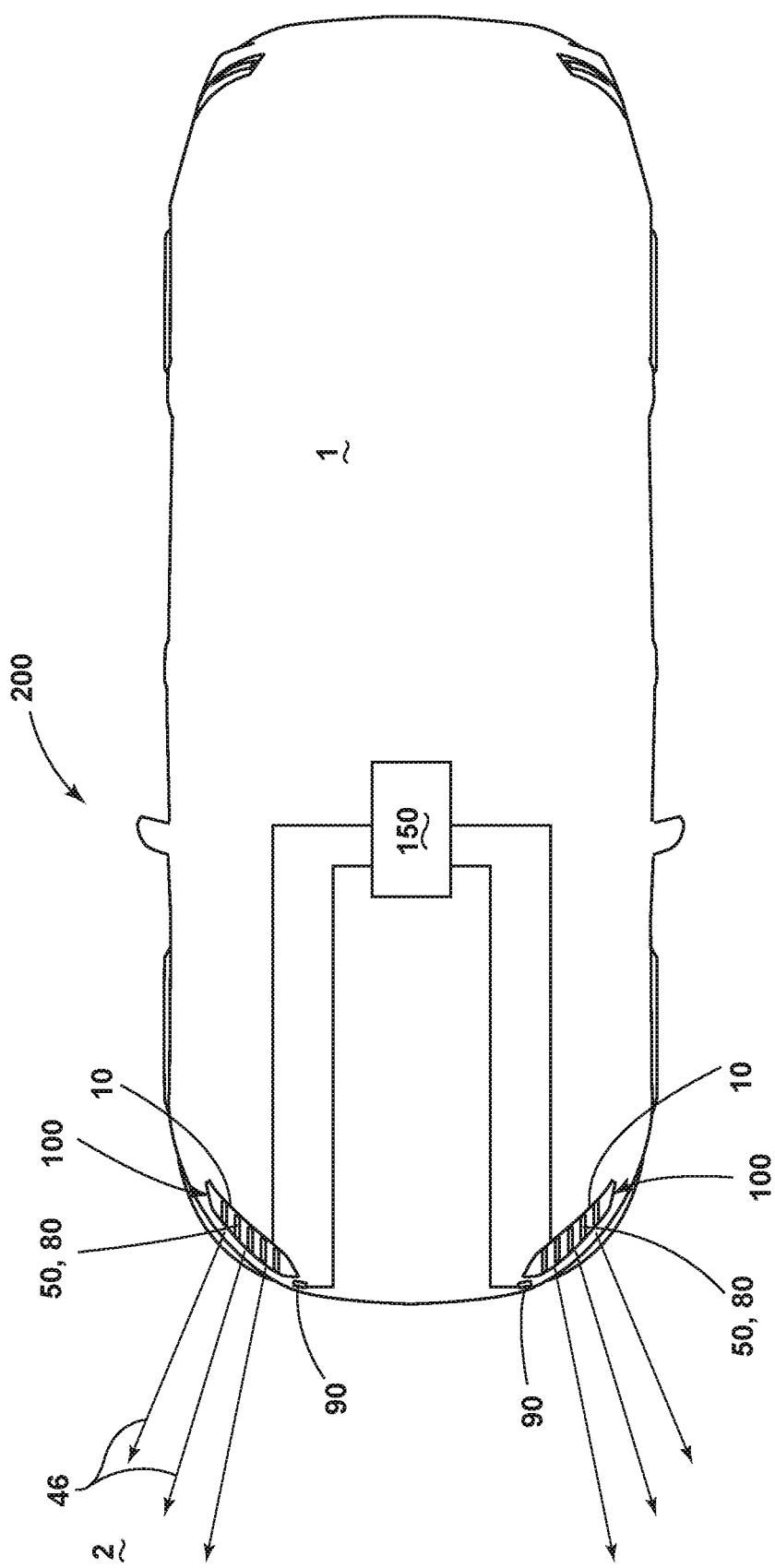
FIG. 2 is a schematic plan view of a headlamp system for a vehicle transmitting a headlamp pattern, according to an aspect of the disclosure.

Referring now to FIG. 2, a schematic plan view is provided of a headlamp system 200 for a vehicle 1, as transmitting a headlamp pattern 46 to the exterior 2 of the vehicle. The headlamp system 200 includes a headlamp 100, which includes a photochromic lens 10, one or more primary light sources 50, and one or more secondary sources 80. The system 200 also includes an imaging sensor 90 and a controller 150 that is coupled to the one or more primary light sources 50, the one or more secondary sources 80 and the imaging sensor 90. As depicted in FIG. 2, the primary sources 50 of the headlamp system 200 are directed by the controller 150 to produce and transmit a headlamp pattern 46 that exits the photochromic lens 10.

Figure 2A:
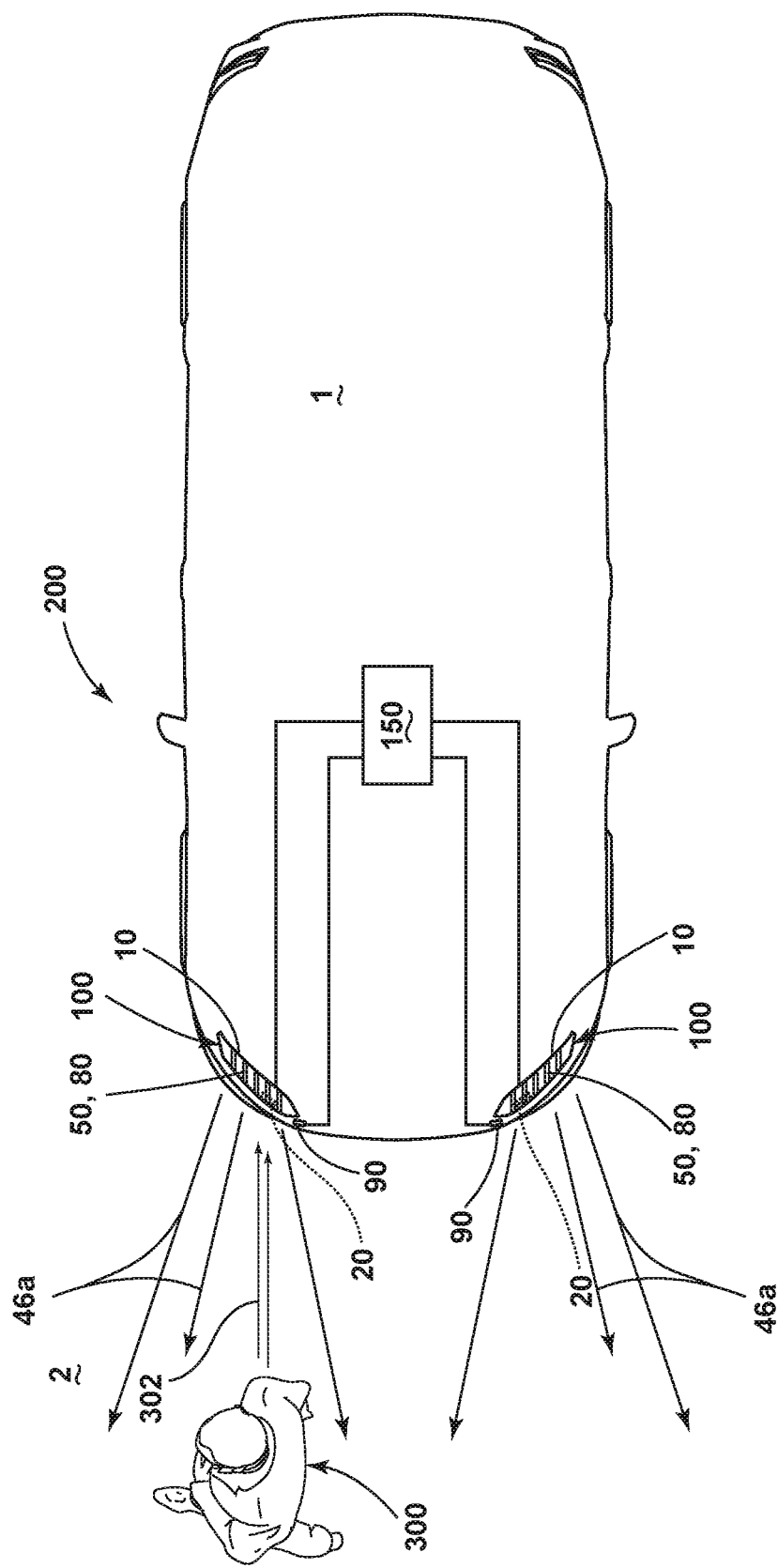
FIG. 2A is a schematic plan view of the headlamp system depicted in FIG. 2, as transmitting a headlamp pattern and with a portion of the lens darkened in response to an object exterior to the vehicle sensed by the sensor, according to an aspect of the disclosure.

Referring now to FIG. 2A, the headlamp system 200 of FIG. 2 is shown again, as in operation in response to an object 300 in proximity to the vehicle 1. More particularly, the controller 150 is shown as directing the secondary sources 80 to darken a portion 20 of each lens 10 in response to an object 300 (see FIG. 2A) that is in the exterior 2 of the vehicle 1 and sensed by the sensors 90. More particularly, the object 300 (e.g., a pedestrian, oncoming vehicle, other traffic and/or an animal) is detected by the controller 150 through images 302 that are sensed by each imaging sensor 90. As the portion 20 of the lens 10 is darkened by the secondary light source 80, the headlamp pattern 46 shown in FIG. 2 is converted to an adjusted headlamp pattern 46*a*, as shown in FIG. 2A. Notably, the adjusted headlamp pattern 46*a* does not strike or otherwise interfere with the object 300. Further, as the object 300 moves in the exterior 2 of the vehicle 1, images 302 are transmitted to the imaging sensor 90 and reported to the controller 150. The controller 150 can then adjust the secondary sources 80 to darken other portion(s) 20 of the lens 10 to develop new, adjusted headlamp patterns 46*a* that do not strike or otherwise interfere with the object 300 at its new location relative to the vehicle 1. Further, as the secondary sources 80 are adjusted by the controller 150 to darken new portions 20 within the photochromic lens 10, the 'older' portions 20 are not exposed to incident light 84 (see FIG. 1B) from these same secondary sources 80. As a result, these 'older' portions 20 will lighten, allowing additional incident and reflected light 42, 44 (see FIG. 1B) from the primary sources 50 to travel through the photochromic lens 10 and contribute to the adjusted headlamp pattern 46*a*.

Figure 3A:
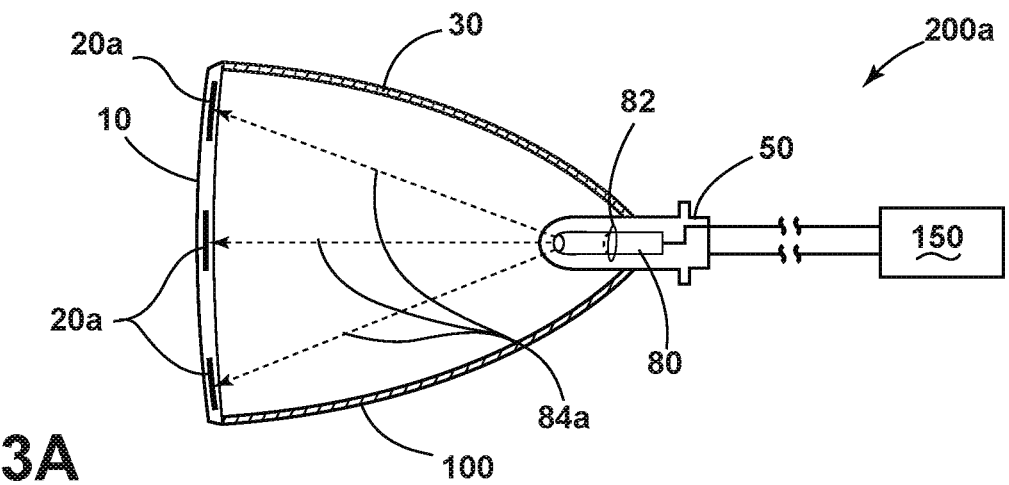
FIG. 3A is a cross-sectional view of the headlamp with a movable secondary source in a headlamp system, according to an aspect of the disclosure.

Referring now to FIG. 3A, a cross-sectional view of a headlamp system 200*a* and a headlamp 100 is depicted according to an embodiment. In particular, the system 200*a* includes a headlamp 100 with a movable secondary source 80 and a primary light source 50, as installed within a housing 30 and behind a photochromic lens 10. The system 200*a* further includes a controller 150 that is configured to move, aim or otherwise adjust the secondary source 80 by operation of a positioning system 82 to direct incident light 84*a* against different locations of the photochromic lens 10. As various portions 20*a* of the photochromic lens 10 are illuminated by the incident light 84*a* from the secondary source 80, each of these portions 20*a* darkens. Further, as the incident light 84*a* is removed from any of these portions 20*a* by movement of the secondary source 80 by the positioning system 82, any such portion 20*a* not exposed to incident light 84*a* will lighten and become transparent or semi-transparent by the reversible action of the photochromic material contained in the lens 10.

Figure 3B:
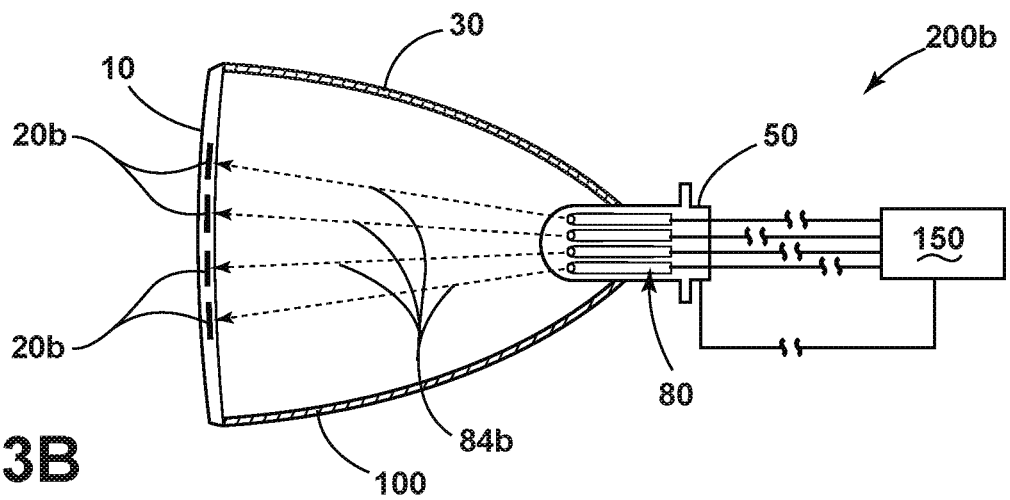
FIG. 3B is a cross-sectional view of the headlamp with a plurality of secondary sources in a headlamp system, according to an aspect of the disclosure.

According to another embodiment, a headlamp system 200*b* and a headlamp 100 are depicted in cross-sectional form in FIG. 3B. In particular, the system 200*b* includes a headlamp 100 with a plurality of secondary sources 80 and a primary light source 50, as installed within a housing 30 and behind a photochromic lens 10. In some embodiments, the plurality of secondary sources 80 are located adjacent to one another and configured as a bank of sources. Further, the sources 80 configured as a bank of sources can be movable in some embodiments, or stationary in other embodiments. In other embodiments, the secondary sources 80 can be placed in different locations within the headlamp 100, e.g., as spaced apart at various distances from one another. In addition, the system 200*b* shown in FIG. 3B also includes a controller 150 that is configured to individually activate each of the secondary sources 80 to direct incident light 84*b* from each of these sources 80 against different locations of the photochromic lens 10. As various portions 20*b* of the photochromic lens 10 are illuminated by the incident light 84*b* from one or more of the secondary sources 80 by the controller 150, each of these portions 20*b* darkens. Further, as the incident light 84*b* is removed from any of these portions 20*b* through deactivation of one or more sources 80 by the controller 150, any such portion 20*b* not exposed to incident light 84*b* will lighten and become transparent or semi-transparent by the reversible action of the photochromic material contained in the lens 10.

Figure 3C:
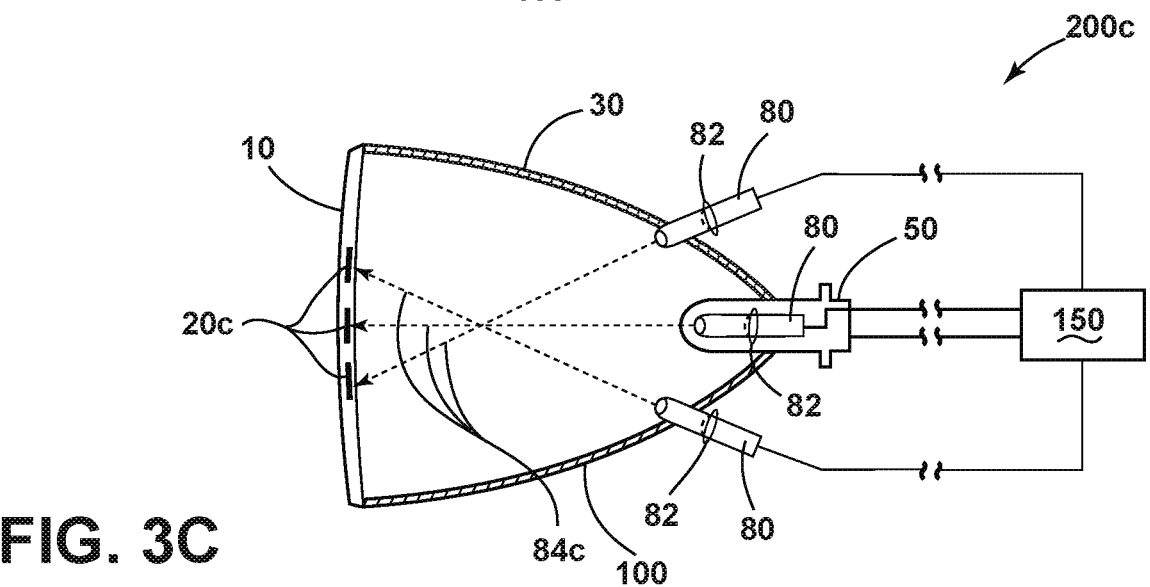
FIG. 3C is a cross-sectional view of the headlamp with a plurality of movable secondary sources in a headlamp system, according to an aspect of the disclosure.

According to a further embodiment, a headlamp system 200c and a headlamp 100 are depicted in cross-sectional form in FIG. 3C. In particular, the system 200c includes a headlamp 100 with a plurality of movable secondary sources 80 and a primary light source 50, as installed within a housing 30 and behind a photochromic lens 10. In some embodiments, the plurality of secondary sources 80 are located adjacent to one another and configured as a bank of sources. In other embodiments, the secondary sources 80 can be placed in different locations within the headlamp 100, e.g., as spaced apart at various distances from one another. In addition, the system 200b shown in FIG. 3C also includes a controller 150 that is configured to individually activate each of the secondary sources 80 to direct incident light 84c from each of these sources 80 against different locations of the photochromic lens 10. The controller 150 is also configured to individually move, adjust or otherwise aim each of the secondary sources 80 by operation of one or more positioning systems 82 to direct incident light 84c from each of these sources toward different locations on the photochromic lens 10. As various portions 20c of the photochromic lens 10 are illuminated by the incident light 84c from one or more of the secondary sources 80 by the controller 150, each of these portions 20c darkens. Further, as the incident light 84c is removed from any of these portions 20c through deactivation of one or more sources 80 by the controller 150, any such portion 20c not exposed to incident light 84c will lighten and become transparent or semi-transparent by the reversible action of the photochromic material contained in the lens 10.

Variations and modifications can be made to the aforementioned structure without departing from the concepts of the present invention. For example, the principles of the headlamp system 200 outlined in the disclosure can be applied to other vehicular lighting systems. For example, aspects of these systems can be employed in the various headlamps, turn signals and fog lamps of a vehicle to maximize the performance of the light patterns produced by each of these sources while selectively protecting pedestrians, oncoming vehicles and other traffic from exposure to them. These adaptive lighting systems can be employed in various non-vehicular applications. For example, these systems can be employed as an overhead LED dome lighting system on a passenger jet to maximize the amount of light transmitted to a particular passenger without exposing other passengers (including those adjacent to the passenger activating the system) to the light from the dome light system. Such variations and modifications, and other embodiments understood by those with skill in the field within the scope of the disclosure, are intended to be covered by the following claims unless these claims by their language expressly state otherwise.

What is claimed is:

1. A lamp system for a vehicle, comprising:
   a vehicular lamp comprising a photochromic lens, a primary light source for transmitting a light pattern through the lens and a plurality of secondary light sources;
   an imaging sensor; and
   a controller that aims the secondary light sources to darken a portion of the lens in response to an object exterior to the vehicle sensed by the sensor,
   wherein the photochromic lens is configured to darken upon exposure to ultraviolet radiation and the secondary light sources are laser light sources configured to transmit ultraviolet light.

2. The system according to claim 1, wherein the photochromic lens comprises an inner lens, the inner lens comprising a photochromic element.

3. The system according to claim 1, wherein the photochromic lens comprises an outer lens, the outer lens comprising an ultraviolet light shielding element.

4. The system according to claim 1, wherein the light pattern is a high beam headlamp pattern.

5. The system according to claim 1, wherein the object sensed by the sensor is a pedestrian, an oncoming vehicle, other traffic or an animal located within the light pattern.

6. The system according to claim 1, wherein the secondary light sources are located adjacent to one another in a bank configuration.

7. The system according to claim 1, wherein the secondary light sources are spaced apart from one another within the vehicular lamp.

8. A lamp system for a vehicle, comprising:
   a vehicular lamp comprising a photochromic lens, a primary light source for transmitting a light pattern through the lens and a plurality of movable secondary light sources;
   an imaging sensor; and
   a controller that individually aims each of the secondary light sources to darken a different portion of the photochromic lens in response to an object exterior to the vehicle sensed by the sensor,
   wherein the photochromic lens is configured to darken upon exposure to ultraviolet radiation and the secondary light sources are laser light sources configured to transmit ultraviolet light.

9. The system according to claim 8, wherein the photochromic lens comprises an inner lens, the inner lens comprising a photochromic element.

10. The system according to claim 8, wherein the photochromic lens comprises an outer lens, the outer lens comprising an ultraviolet light shielding element.

11. The system according to claim 8, wherein the light pattern is a high beam headlamp pattern.

12. The system according to claim 8, wherein the object sensed by the sensor is a pedestrian, an oncoming vehicle, other traffic or an animal located within the light pattern.

13. The system according to claim 8, wherein the secondary light sources are located adjacent to one another in a bank configuration.

14. The system according to claim 8, wherein the secondary light sources are spaced apart from one another within the vehicular lamp.

15. A lamp system, comprising:
    a lamp comprising a photochromic lens, a primary light source for transmitting a light pattern through the lens and a plurality of movable secondary light sources;
    an imaging sensor; and
    a controller that aims the secondary light sources to darken a portion of the lens in response to an object exterior to the lamp sensed by the sensor,
    wherein the photochromic lens is configured to darken upon exposure to ultraviolet radiation and the secondary light sources are laser light sources configured to transmit ultraviolet light.

16. The system according to claim 15, wherein the photochromic lens comprises an inner lens, the inner lens comprising a photochromic element.

17. The system according to claim 15, wherein the photochromic lens comprises an outer lens, the outer lens comprising an ultraviolet light shielding element.

18. The system according to claim 15, wherein the object sensed by the sensor is a person located within the light pattern.

19. The system according to claim 15, wherein the secondary light sources are located adjacent to one another in a bank configuration.

20. The system according to claim 15, wherein the secondary light sources are spaced apart from one another within the lamp.

* * * * *

UNITED STATES PATENT AND TRADEMARK OFFICE
CERTIFICATE OF CORRECTION

PATENT NO. : 10,871,265 B2  
APPLICATION NO. : 16/702750  
DATED : December 22, 2020  
INVENTOR(S) : Robinson Page 1 of 1

It is certified that error appears in the above-identified patent and that said Letters Patent is hereby corrected as shown below:

In the Claims

Column 9:
Claim 1, Line 58:
After "of" insert --movable--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*